(12) United States Patent
Edwards

(10) Patent No.: US 6,193,335 B1
(45) Date of Patent: Feb. 27, 2001

(54) ENDLESS DRIVE TRACK WITH IMPROVED DRIVE LUG CONFIGURATION

(76) Inventor: John W. Edwards, 7269 Beo Ridge Rd., Sarasota, FL (US) 34241

( * ) Notice: Subject to any disclaimer, the term of this patent is extended or adjusted under 35 U.S.C. 154(b) by 0 days.

(21) Appl. No.: 09/347,571

(22) Filed: Jul. 6, 1999

(51) Int. Cl.$^7$ .............................. B62D 55/24; F16G 1/04
(52) U.S. Cl. ............................ 305/167; 305/173
(58) Field of Search .................. 305/165, 167 I, 305/169, 171, 177, 178, 179, 180, 195, 199, 160, 193, 194, 173

(56) References Cited

U.S. PATENT DOCUMENTS

| | | |
|---|---|---|
| Re. 33,324 | 9/1990 | Edwards et al. . |
| 3,575,474 * | 4/1971 | Russ, Sr. ................ 305/165 |
| 3,721,477 * | 3/1973 | Cooper et al. .......... 305/179 |
| 3,747,995 * | 7/1973 | Russ, Sr. ................ 305/179 |
| 3,900,231 * | 8/1975 | Ohm ...................... 305/167 |
| 4,218,932 * | 8/1980 | McComber ............. 305/169 |
| 4,569,561 | 2/1986 | Edwards et al. . |
| 4,844,560 | 7/1989 | Edwards et al. . |
| 4,884,852 | 12/1989 | Edwards et al. . |
| 5,005,922 | 4/1991 | Edwards et al. . |
| 5,020,865 | 6/1991 | Edwards et al. . |
| 5,040,282 | 8/1991 | Edwards et al. . |
| 5,447,365 * | 9/1995 | Muramatsu et al. ... 305/167 |
| 5,484,321 * | 1/1996 | Ishimoto ................ 305/195 |
| 5,984,438 * | 11/1999 | Tsunoda et al. ....... 305/179 |
| 6,000,766 * | 12/1999 | Takeuchi et al. ...... 305/165 |

OTHER PUBLICATIONS

Installation Manual for Skid Steer Loaders, Goodyear Tire & Rubber Co., (Manual), Sep. 1998.
Challenger 85E Agricultural Tractor, Caterpillar, Inc., (Brochure), 1998.
Challenger 95E Agricultural Tractor, Caterpillar, Inc., (Brochure), 1998.
Challenger 35 & 45 Agricultural Tractors, Caterpillar, Inc., (Brochure), 1994.
Trackman, Goodyear Tire & Rubber Co., (Leaflet), 1999.
Get a Grip on the Toughest Jobs with Trackman, Goodyear Tire & Rubber Co., (Brochure), 1999.
Posi–Track HD, ASV, Inc., (Brochure), (This brochure was published prior to the filing date of the instant application, and it is Applicant's present understanding that the subject matter was in the public domain more than one year prior to the filing date of the instant application.).

* cited by examiner

Primary Examiner—S. Joseph Morano
Assistant Examiner—Jason R. Bellinger
(74) Attorney, Agent, or Firm—Oliff & Berridge, PLC

(57) ABSTRACT

An endless drive track system for use with a tracked vehicle includes a planetary drive system having drive rollers, a plurality of roller wheels, an endless track having an interior surface and a plurality of drive lugs attached to the interior surface. Each drive lug includes at least one drive face that is positively engaged by the drive rollers of the planetary drive system, and longitudinal faces that are engageable with the sides of the roller wheels. Each longitudinal face has an angled shape defined by upper and lower portions. The lower portion is substantially perpendicular to the interior surface while the upper portion is angled between about 5° and 60° with respect to the lower portion. This arrangement promotes lateral guidance of the endless track and reduces the potential of damaging contact between the longitudinal faces and the roller wheels. The endless track may include a reinforcing brace having flanges that protect the longitudinal faces. The reinforcing brace extends from the interior surface of the endless track and decreases the amount each of the drive lugs erodes from possible contact with the roller wheels.

39 Claims, 9 Drawing Sheets

# ENDLESS DRIVE TRACK WITH IMPROVED DRIVE LUG CONFIGURATION

BACKGROUND OF THE INVENTION

1. Field of Invention

The present invention relates to a track for an endless drive track system. More particularly, the present invention relates to an endless drive track having an improved drive lug configuration for use with a tracked vehicle such as a tractor, bulldozer or tank.

2. Description of Related Art

Conventional endless drive track systems are used with tracked vehicles such as tractors, bulldozers, tanks or the like, as shown in U.S. Pat. No. Re. 33,324, incorporated herein by reference. As shown in FIG. 1 herein, a vehicle 1 includes an endless drive track system 2 with an endless track 3, a drive system, e.g., a planetary drive system 4, and a plurality of roller wheels 5, also commonly known as idler wheels that guide, laterally align and support the track 3. The planetary drive system 4 and the plurality of roller wheels 5 are located at separate positions within the endless drive track system 2. For example, when the drive rollers 6 (see FIGS. 2 and 3) of the planetary drive system 4 rotate in a clockwise direction, the endless track 3 is driven in the clockwise direction. The roller wheels 5 also rotate in the clockwise direction due to the frictional engagement of the roller wheels 5 with the driven endless track 3. Alternatively, the roller wheels 5 can be positively driven. Consequently, the drive rollers 6, the roller wheels 5 and the endless track 3 rotate in a common direction.

The endless track 3 is comprised of a plurality of drive sections 7. FIG. 2 shows an exploded perspective view of an exemplary drive section 7 where the drive rollers 6 of the planetary drive system 4 engage the drive section 7 of the endless track. Each drive section 7 includes an interior surface 8 and an exterior surface 9. The exterior surface 9 of each drive section 7 faces away relative to the endless drive track system 2 and includes a tread that contacts the ground over which the tracked vehicle 1 travels. The interior surface 8 of each drive section 7 faces toward the endless drive track system 2 and includes a plurality of drive lugs 10 extending inwardly from the interior surface 8.

Typically, each drive lug 10 includes four faces 10a–10d. Faces 10b and 10d are drive faces that extend in a direction transverse to the traveling direction of the endless track 3 and are contacted and driven by the drive rollers 6. An arrow A indicates the traveling direction of the endless track 3 as being from right to left, although the traveling direction of the endless track 3 can also be from left to right. The remaining faces 10a and 10c are longitudinal faces and extend in a direction substantially parallel to the traveling direction of the endless track 3. At least one purpose of the longitudinal faces 10a and 10c is to guide the endless track 3 as it travels past the roller wheels 5.

FIG. 3 shows a schematic diagram of the drive rollers 6 rotated in a clockwise direction by the planetary drive system 4 to engage and drive the drive lugs 10. When a drive section 7 of the endless track 3 reaches the planetary drive system 4, the rotated drive rollers 6 of the planetary drive system 4 contact drive face 10b of the drive lugs 10 to drive the endless track 3 in the clockwise direction. Similarly, when the drive rollers 6 are rotated in the counterclockwise direction, the drive rollers 6 contact drive face 10d of the drive lugs 10 to drive the endless track 3 in a counterclockwise direction. As such, upon contacting the drive face 10b or 10d of the drive lugs 10, the drive rollers 6 are able to drive the drive section 7 of the endless track 3 in the desired traveling direction. The drive rollers 6 repeat the above-described operation for every drive lug 10 passing through the planetary drive system 4.

As the drive rollers 6 of the planetary drive system 4 are typically constructed from wear-resistant materials, e.g., metals, and the endless track 3 is typically made of a polymeric material, the engagement of the drive rollers 6 with the drive lugs 10 of the endless track 3 may result in the wearing down or erosion of the drive lugs 10. Although the drive rollers 6 are illustrated as substantially filling the region between adjacent drive lugs 10, the size of the drive rollers 6 can be made smaller, as long as the drive rollers 6 are capable of engaging the drive faces 10b and 10d of the drive lugs 10.

FIG. 4 shows an exploded perspective view where the roller wheels 5 engage a drive 7 section of the endless track 3 driven in the clockwise, i.e., right to left, direction. In the illustration, three roller wheels 5 are provided on a common shaft, although more or less than three rollers can be provided, and independent shafts may be desirable, depending on need. As such, because of the frictional engagement of the endless track 3 with the roller wheels 5, each roller wheel 5 is rotated in the clockwise direction with the drive section 7 of the endless track 3. The rotation of the roller wheels 5 provides even support across the endless track 3 in an orthogonal direction relative to the direction the track 3 is driven.

FIG. 5 is cross-sectional view of the roller wheels 5 engaging the drive section 7 of the endless track 3 shown in FIG. 4, as taken along section line 5—5. The spacing of the roller wheels 5 relative to the drive lugs 10 is such that the roller wheels 5 should not contact the longitudinal faces 10a and 10c of the drive lugs 10 while engaging the drive section 7. To this end, the total length of the combined distances X and Y is typically about ⅜"–½".

As represented by the bi-directional arrows in FIG. 5, the endless track 3 has a tendency to move with respect to the roller wheels 5 in the direction parallel to the axes of the roller wheels 5. Consequently, the roller wheels 5 may contact the longitudinal faces 10a and 10c of the drive lugs 10. As the roller wheels 5 are typically constructed from wear-resistant materials and the endless track 3 is typically made of a polymeric material, the frictional engagement of the roller wheels 5 with the drive lugs 10 results in the wearing down or eroding of the longitudinal faces 10a and 10c of the drive lug 10.

For example, as shown in FIG. 6, which is an enlargement of the dashed box of FIG. 5, contact between the roller wheels 5 and the longitudinal faces 10a and 10c of the drive lug 10 results in the wearing away of the longitudinal faces 10a and 10c. The worn away portions of the drive lug 10 are represented by the shaded region R. The gradual decrease in the surface area weakens the drive lugs 10 and causes early failure of the drive belt. For example, the endless drive belt may need to be replaced after 300 working hours due to erosion of the drive lugs. Also, due to the reduced surface area, "slipping" can occur between the drive rollers 6 of the planetary drive system 4 and the endless track 3.

Furthermore, the wearing away of the longitudinal faces 10a and 10c weakens the structural integrity of the endless track 3 and permits an increase in lateral "play", i.e., the extent the endless track 3 moves in the direction parallel to the axes of the roller wheels 5. Also, the wearing away of the endless track 3 frequently requires that the endless track 3 be replaced, which requires a stoppage of work, increases the cost associated with using the tracked vehicle 1, and increases labor costs.

SUMMARY OF THE INVENTION

One aspect of the invention is to provide an endless track including drive lugs having a configuration that better resists erosion and/or abrasion. The drive lugs can also provide better lateral alignment of the drive track and help prevent unwanted lateral play of the track.

A further aspect of the invention is to provide an endless track that can be retrofitted into existing positive drive track systems using a conventional planetary drive system.

Another aspect of the invention is to provide an endless track having reinforcing braces made from wear-resistant material that are capable of better guiding roller wheels and/or preventing roller wheels from wearing away the longitudinal faces of drive lugs extending from the endless track.

It is another aspect of the invention to provide an endless track having reinforcing braces made from wear-resistant material that are capable of preventing the drive rollers of the planetary drive system from slipping when attempting to engage the drive lugs.

It is another aspect of the invention to provide an endless track having reinforcing braces made from wear-resistant material that decreases the frequency at which the endless track must be replaced because the track is worn away, the number of work stoppages to replace the track, as well as labor costs.

In order to achieve the above, and to overcome the shortcomings in the related art, an endless drive track system for use with a tracked vehicle according to a preferred embodiment of the invention includes a positively driven endless track having an interior surface and a plurality of drive lugs attached to the interior surface, each of the drive lugs including at least one drive face and first and second longitudinal faces, each of the first and second longitudinal faces having a first portion adjacent the interior surface and a second portion remote from the interior surface, each of the first and second portions forming an inside angle of less than 180° with respect to one another, and a drive system cooperteable with the at least one drive face of the drive lug.

The endless drive track system may further comprise a plurality of roller wheels that guide and support the endless track, the plurality of roller wheels being positionable to possibly contact the first and second longitudinal faces of the drive lug. The first portion of each of the first and second longitudinal faces may be substantially perpendicular to the interior surface, and an exterior angle between each first portion and each corresponding second portion may be about 5–60°, and preferably about 30–45°, as measured from the second portion to a line extending from the first portion.

A positively driven endless track according to a preferred embodiment of the invention includes an interior surface and a plurality of drive lugs attached to the interior surface, each of the drive lugs including at least one drive face and first and second longitudinal faces, each of the first and second longitudinal faces having a first portion adjacent the interior surface and a second portion remote from the interior surface, each of the first and second portions defining an inside angle of less than 180° with respect to one another.

A reinforcing brace for protecting a longitudinal face of a lug of an endless track according to a preferred embodiment of the invention includes at least one flange positioned adjacent the longitudinal face, wherein the longitudinal face comprises an angled longitudinal face and the at least one flange includes a first flange portion and a second flange portion angled with respect to the first flange portion to protect the angled longitudinal face. The lug may be a drive lug of a positively driven endless track, the at least one flange may be attached to the longitudinal face with at least one of a fastener and an adhesive, and/or the at least one flange may be embedded within the endless track adjacent the longitudinal face.

These and other aspects will be described in or apparent from the following detailed description of preferred embodiments.

BRIEF DESCRIPTION OF THE DRAWINGS

Preferred embodiments of the invention will be described in conjunction with the following drawings in which like reference numerals designate like elements and wherein.

DETAILED DESCRIPTION OF PREFERRED EMBODIMENTS

Figure 7:
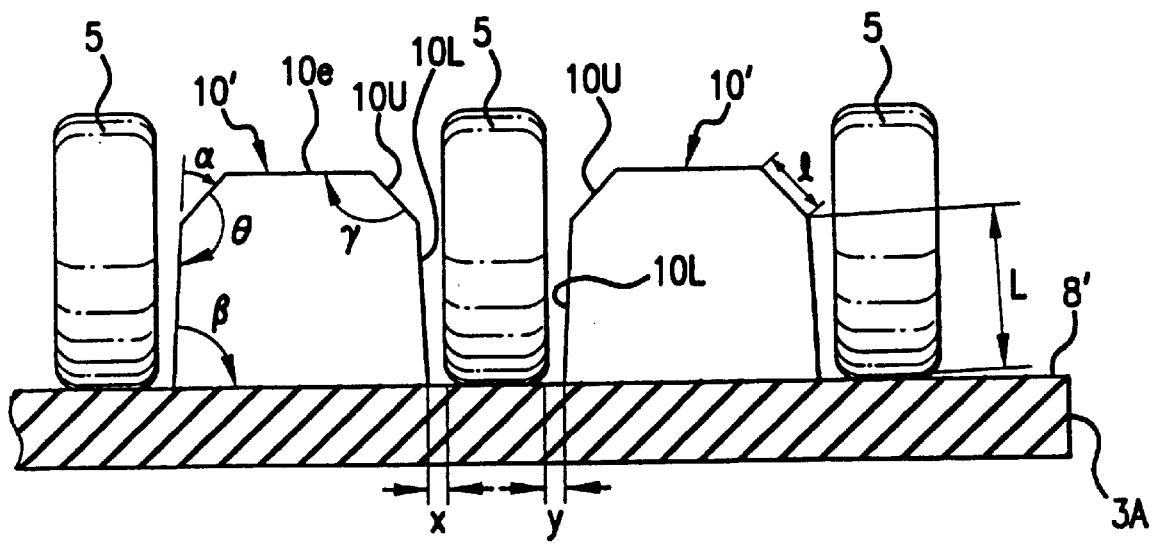
FIG. 7 is a cross-sectional view of an endless track according to a preferred embodiment of the present invention.

FIG. 7 is a cross-sectional view of an endless track 3A according to one preferred embodiment of the present invention. The endless track 3A includes a pair of drive lugs 10' that are integrally formed with or attached to an interior surface 8' of the endless track 3A. A plurality of roller wheels 5 are disposed between drive lugs 10'.

Figure 4:
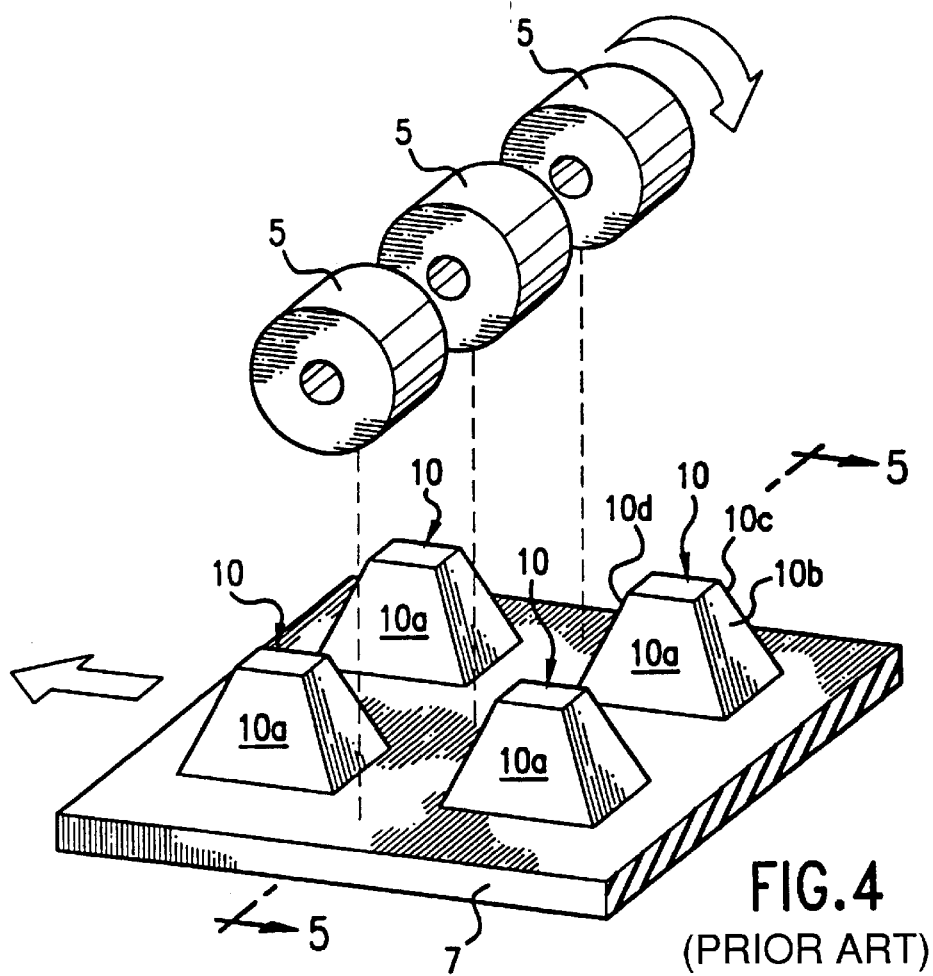
FIG. 4 is an exploded perspective view where the roller wheels of the conventional endless drive track system engage a drive section of the endless track.
Figure 5:
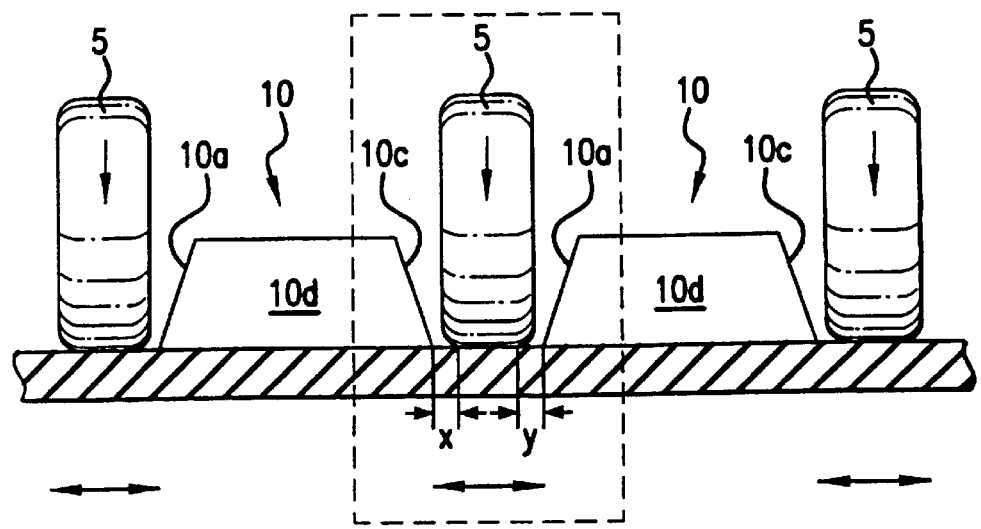
FIG. 5 is a cross-sectional view of the roller wheels engaging a drive section of the endless track, as taken along section line 5—5 of FIG. 4.
Figure 6:
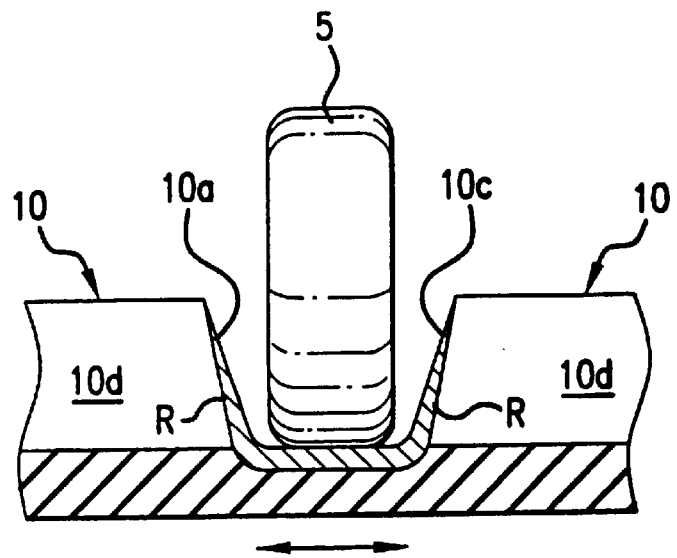
FIG. 6 is an enlarged view of the dashed box of FIG. 5 to illustrate the worn regions of the longitudinal faces of the drive lugs due to frictional contact with the roller wheels.

Each of the drive lugs 10' includes angled longitudinal faces defined by a lower portion 10L extending from the interior surface 8' and an upper portion 10U forming a non-zero angle with the lower portion 10L. The non-zero angle defines an inside angle θ between the upper and lower portions 10U, that is less than 180°. Each lower portion 10L forms an angle β that is 90° or less with respect to the horizontal, e.g., the lower portion 10L forms a substantially right angle with respect to the interior surface 8', and each upper portion 10U forms an exterior angle α with respect to the lower portion 10L as measured from the upper portion 10U to a line extending from the lower portion 10L. The angle α can be selected to promote guidance of the roller wheels 5 into rolling contact with the interior surface 8', while at the same time reducing the possibility of contact between the lower portion 10L and the roller wheels 5. The angle α can be from about 5°–60°, but is preferably between about 30°–45°. If the angle α is too large, then the contact area between the drive faces 10b and 10d (FIG. 4) and the drive rollers 6 may be too small. If the angle α is too small, then possible contact between the roller wheels 5 and the upper portion 10U may be undesirably increased. The upper portion 10U also forms an obtuse angle γ with respect to the top portion 10e. Thus, both the angle θ and the angle γ may be obtuse angles.

Figure 2:
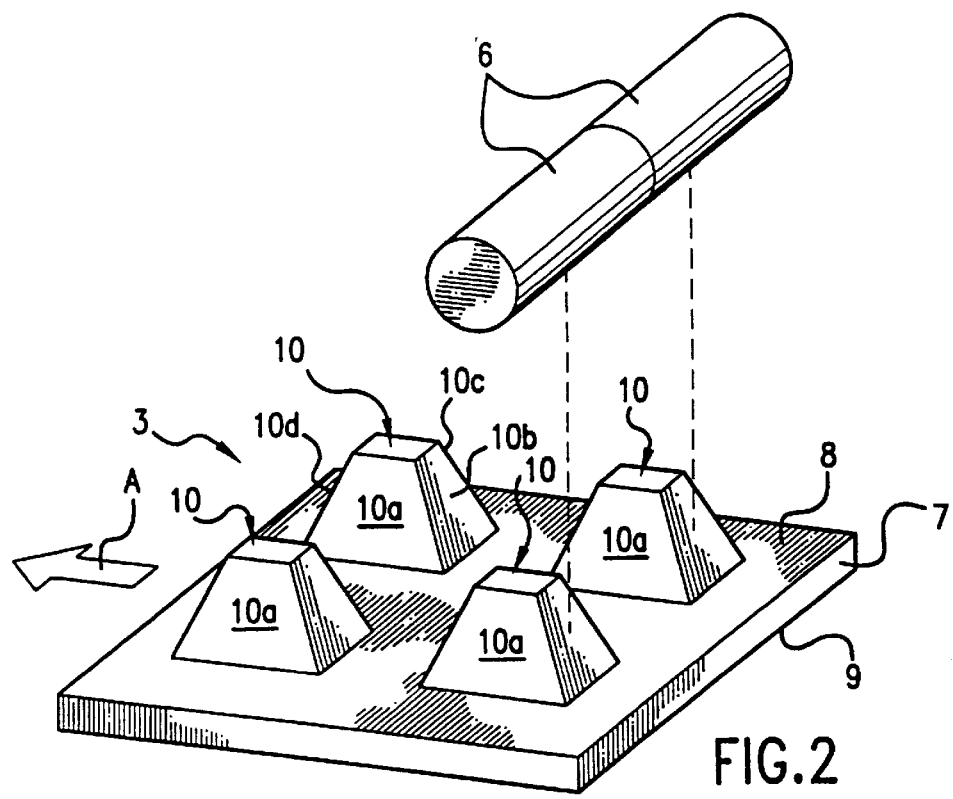
FIG. 2 is an exploded perspective view of an exemplary drive section where drive rollers of the planetary drive system engage a drive section of the endless track.
Figure 3:
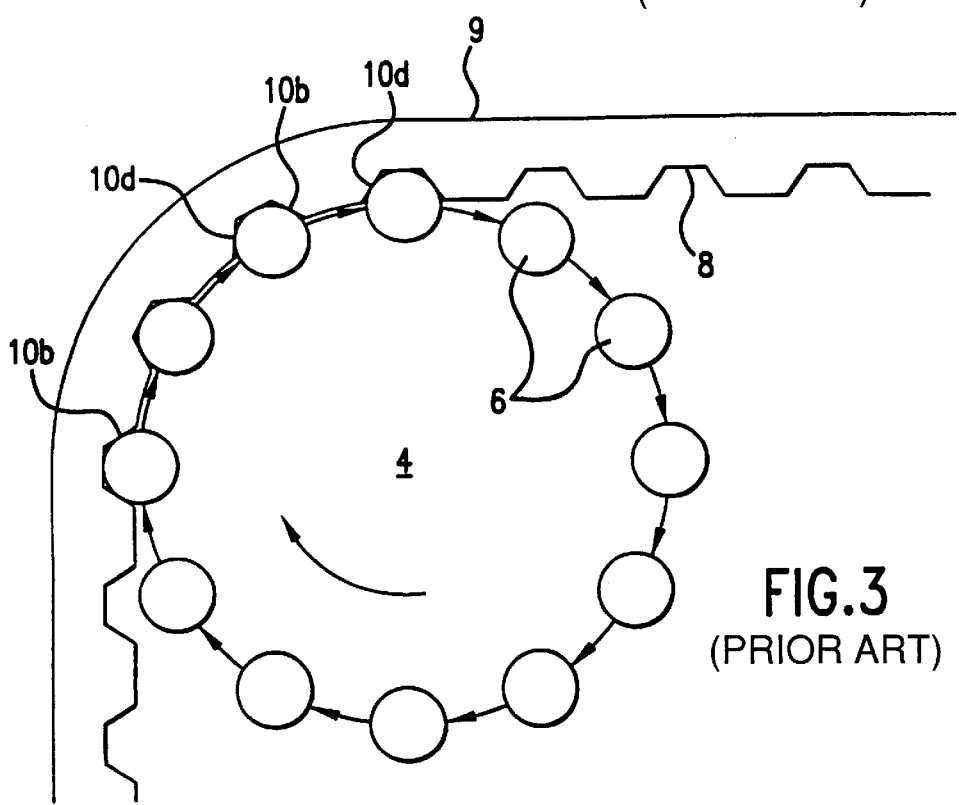
FIG. 3 is a schematic diagram of the drive rollers engaging drive faces of the drive lugs of the conventional drive track system.

Moreover, the dimensions of the upper and lower portions 10U, 10L should be selected to achieve both reduced contact between the roller wheels 5 and the lower portions 10L and positive engagement between the drive faces 10b, 10d and the drive rollers 6 (FIGS. 2 and 3). For example, the length L of the lower portion 10L can be larger than the length l of the upper portion 10U. For example, the length L of the lower portion can be about 1"–1.5", while the length l of the upper portion 10U can be about 0.5"–1.5". Furthermore, the width of the drive faces 10b, 10d should be from about 2 to about 4 times the width of the longitudinal faces 10a, 10c.

Also, FIG. 7 shows that the left and right sides of the central one of the roller wheels 5 are separated from the corresponding adjacent lower portion 10L by distances X and Y, respectively. The total length of the combined distances X and Y should be no more than about 3/16"–1/4", and preferably no more than 3/16". With this amount of spacing, the lateral play or shifting of the endless track 3A can be further prevented, i.e., the distance between adjacent longitudinal faces (as measured along the interior surface 8') is about 3/16"–1/4" greater than a thickness of the central one of the roller wheels 5.

Figure 1:
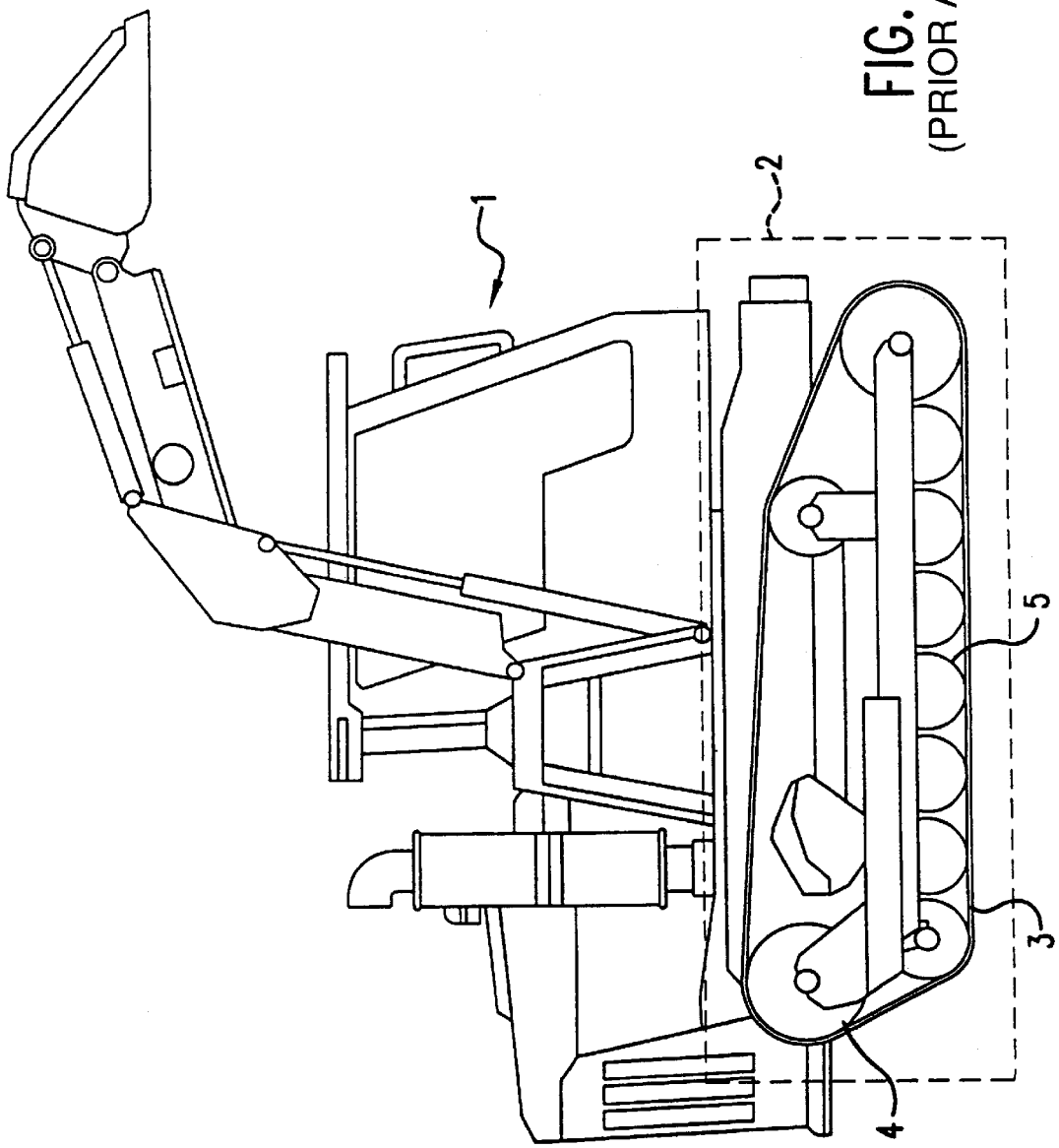
FIG. 1 is a schematic side view of a tracked vehicle having a conventional endless drive track system.
Figure 8:
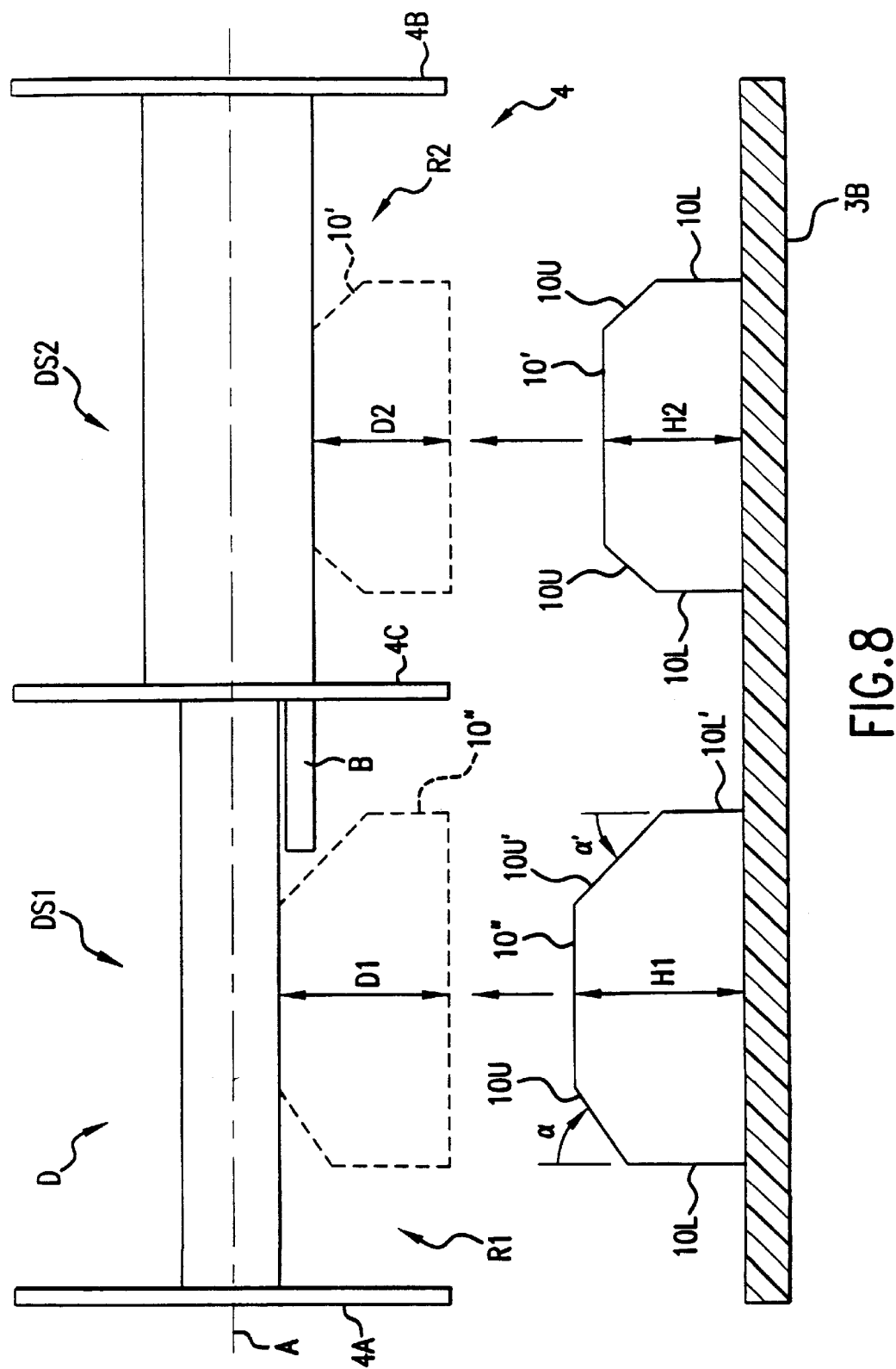
FIG. 8 is a cross-sectional view of an endless track according to another preferred embodiment of the present invention.

FIG. 8 shows a preferred second embodiment of the present invention. FIG. 8 is a cross-sectional view of an endless track 3B and the planetary drive system 4, as shown in FIGS. 1 and 3. In FIG. 8, the drive rollers 6 have been removed from the planetary drive system 4 for clarity. (In FIG. 4, the drum D has been removed from the drive rollers 6 for clarity.) The planetary drive system 4 includes a drum D that rotates about an axis A. Further details of this conventional planetary drive 4 can be seen in ASV's brochure entitled "POSI-TRACK HD—Performance Beyond the Ordinary" (incorporated herein by reference), which shows a tracked vehicle.

The drum D includes end flanges 4A and 4B, as well as a central flange 4C. The central flange 4C divides the drum D into first and second drive sections DS 1 and DS2. The first drive section DS1 defines a first annular recess R1 while the second drive section DS2 defines a second annular recess R2. The first annular recess R1 defines a drive lug insertion depth D1, while the second annular recess R2 defines a second drive lug insertion depth D2 that is less than the first drive lug insertion depth D1.

The endless track 3B in FIG. 8 is structured to cooperate with the planetary drive system 4. The endless track 3B includes a first drive lug 10' that is substantially identical to the drive lug 10' shown in FIG. 7. However, the endless track 3B also includes a second drive lug 10" that is different from the first drive lug 10'. One difference between the first and second drive lugs 10' and 10" is that the second drive lug 10" has a height H1 that is greater than a height H2 of the first drive lug 10'. This feature allows the second drive lug 10" to penetrate to the maximum possible extent within the recess R1 of the drum D, which increases positive engagement with the drive rollers 6 and promotes better guidance. Thus, the height H1 and the drive lug insertion depth D1 are substantially equal. The positions of the drive lugs 10' and 10" are shown in phantom lines within the recesses R2 and R1, respectively.

Another difference between the first and second drive lugs 10' and 10" is that the second drive lug 10" includes an asymmetrical shape due to upper and lower portions 10U and 10L that are shaped differently than the upper and lower portions 10U' and 10L'. The asymmetrical shape can be achieved by forming the lengths of the upper and lower portions 10U' and 10L' differently from the lengths of the upper and lower portions 10U and 10L, and/or by increasing or decreasing the exterior angle α' in comparison to the exterior angle α. The upper and lower portions 10U' and 10L' (on the right hand side of the second drive lug 10") are dimensioned so as to avoid interference or contact between the second drive lug 10" and, for example, a bolt B found in the inside surface of the first drive section DS1.

Figure 9:
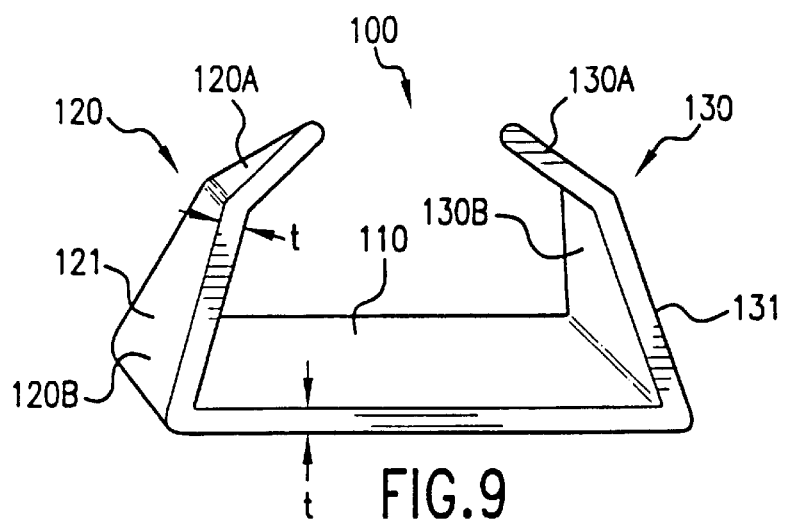
FIG. 9 is a perspective view of a reinforcing brace for protecting a drive lug of the endless track, according to an embodiment of the invention.

FIG. 9 is a perspective view of a reinforcing brace 100 for protecting a drive lug 10 of an endless track 3, according to a preferred embodiment of the invention. Preferably, the reinforcing brace 100 is to be made from a wear-resistant material, such as, for example, metal and/or plastic materials. However, any material that can resist degradation or erosion due to the engagement of the drive rollers 6 from the planetary drive system 4 and/or the contact of the roller wheels 5 would be suitable.

The reinforcing brace 100 may have a uniform thickness t, e.g., about 1/8" to about 1/2", and may include a connecting section 110 having two ends. The ends of the connecting section 110 can be bent to form extending flanges 120 and 130. For example, the brace 100 can initially be flat and then bent to form the flanges 120 and 130. Alternatively, the flanges can be attached, for example, by welding to a separate connecting section. The horizontal section 110 may have a length of about 3"–5", which is preferably slightly longer than a length of the drive lug 10'. Each flange 120 and 130 extends away from the connecting section 110. The flange 120 includes an upper flange portion 120A and a lower flange portion 120B, while the flange 130 includes an upper flange portion 130A and a lower flange portion 130B. The upper and lower portions are angled with respect to one another so as to match the shape of the drive lug 10'.

Figure 10:
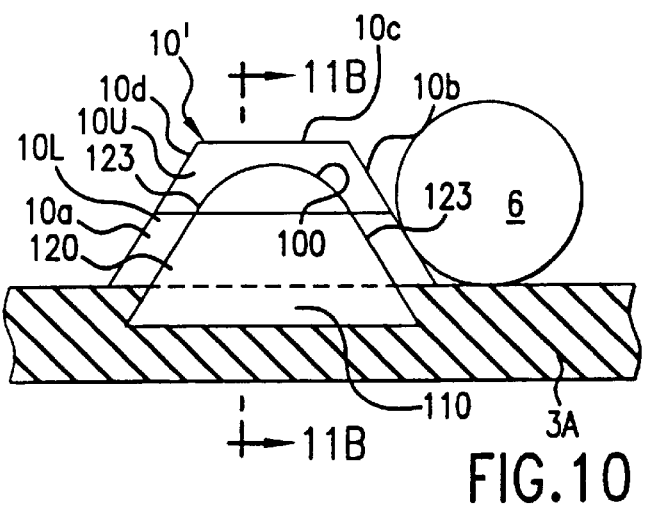
FIG. 10 is a side elevational view of the reinforcing brace embedded in the endless track.

As shown in FIG. 10, the width of the flanges 120 and 130 is about 2"–3" at each base, and is substantially similar to, but may be slightly smaller than, the width of the longitudinal faces of the drive lug 10' such that the drive roller 6 contacts the drive face 10b of the drive lug 10'. The contours of exterior faces 121 and 131 of each extending flange 120 and 130 are also substantially similar to, but may be slightly smaller than, the contours of the longitudinal faces of the drive lug 10'. Also, each flange 120 and 130 of the reinforcing brace 100 has a vertical height that may be slightly smaller than the height of the drive lugs 10'.

Figure 11:
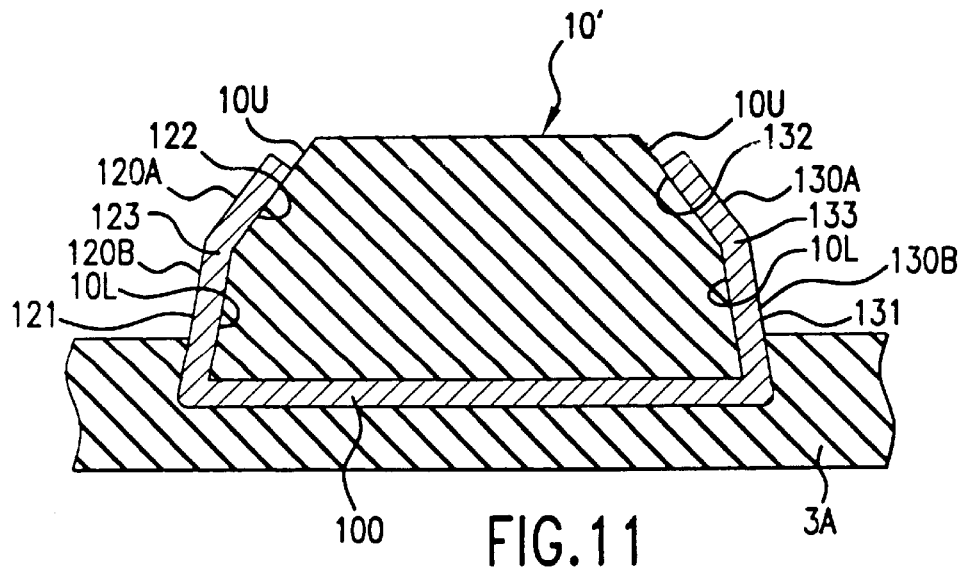
FIG. 11 is cross-sectional view of the reinforcing brace of FIG. 10 embedded in the endless track to protect a drive lug.

FIG. 11 is cross-sectional view of the reinforcing brace 100 of FIG. 10 embedded in an endless track 3 to protect the drive lug 10'. The exterior faces 121 and 131 of the extending flanges 120 and 130 serve to protect the longitudinal faces of each drive lug 10' from the roller wheels 5 when the endless track 3 moves. As a result, the endless track 3 is not weakened and does not have to be replaced as often. Also, costs associated with corresponding work stoppages, such as labor, are reduced. For example, the reinforcing brace 100, especially in combination with the shape of the drive lug 10', can extend the life of a drive belt to last up to 3000 hours or more because the drive lugs 10' are protected from damage.

Interior faces 122 and 132 of the flanges 120 and 130 of the reinforcing brace 100 are depicted as being flush with the upper and lower portions 10U, 10L of the longitudinal faces of the drive lug 10' for illustrative purposes. However, the flanges 120 and 130, and/or the upper and/or lower portions 10U, 10L thereof, can be formed to provide a predetermined gap (not shown) between the flanges 120 and 130 and the upper and lower portions 10U, 10L of the longitudinal faces.

Figure 11A:
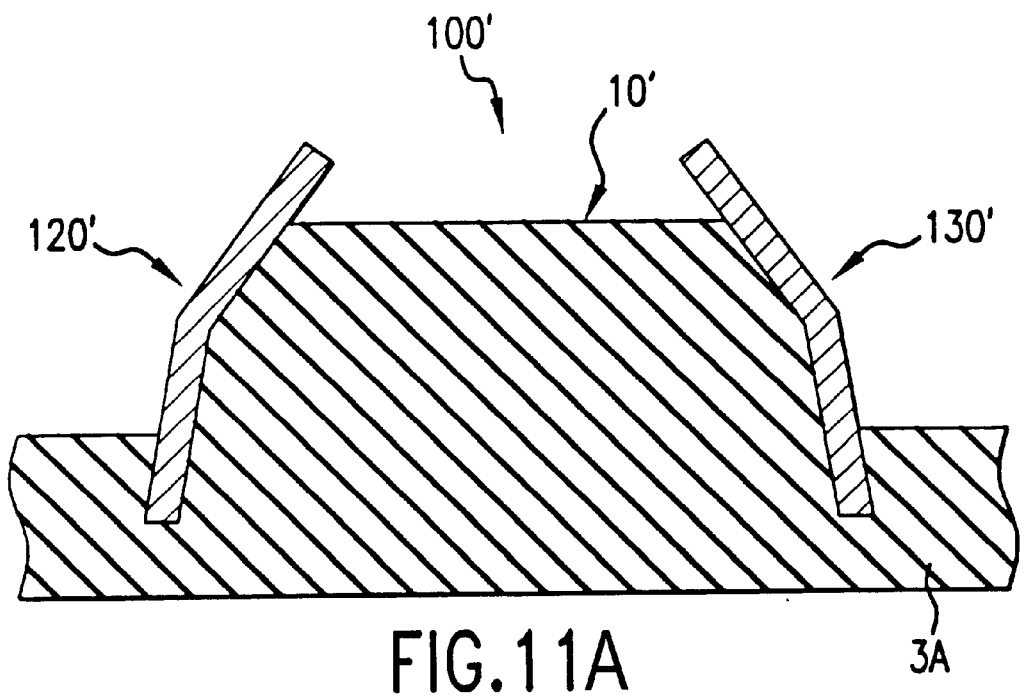
FIG. 11A is a cross-sectional view of an alternative embodiment of a reinforcing brace embedded an endless track.
Figure 11B:
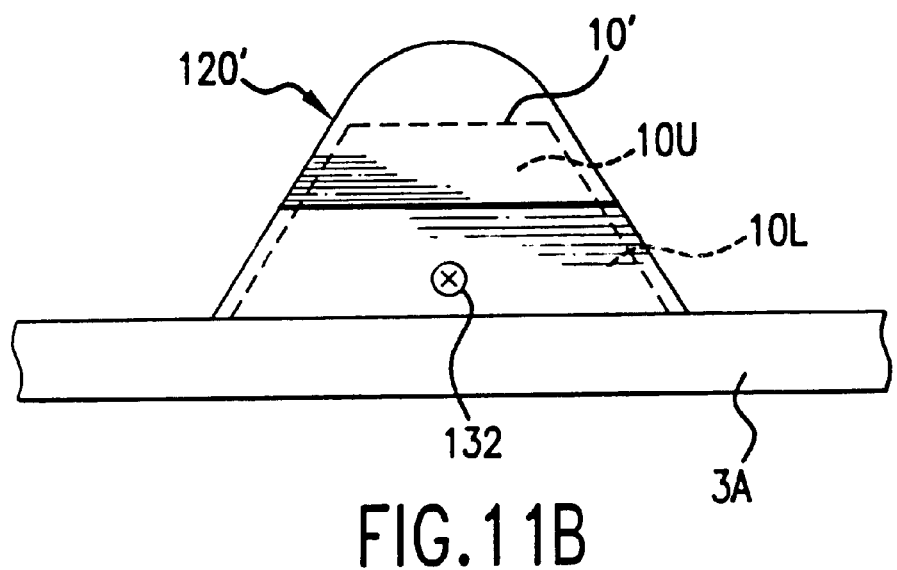
FIG. 11B is a side elevation view of an alternative embodiment of a reinforcing brace attached to a longitudinal face of a drive lug.

FIG. 11A shows another embodiment of a reinforcing brace 100' of the present invention, which is similar to the reinforcing brace 100 shown in FIG. 9, but does not include a connecting section 110. In FIG. 11A, the longitudinal faces are protected and covered with flanges 120' and 130', which are simply embedded within the interior surface of the endless track 3. Alternatively, as shown in FIG. 11B, the flanges 120' and 130' can be mounted directly on the longitudinal faces without embedding, using an adhesive or a fastener such as a screw 132. As shown, the flanges 120' an 130' can have dimensions that are larger than the dimensions (height and width) of the drive lugs 10' to promote better guidance of the roller wheels 5 and/or to reduce erosion of the drive faces 10b, 10d due to contact with the drive rollers 6.

Returning to FIG. 10, it can be seen that the drive rollers 6 positively engage the drive face 10b or 10d of each drive lug 10' depending on the rotation direction of the drive rollers 6. However, assuming wearing away of the drive faces 10b or 10d, edges 123 and 133 of the extending flanges 120 and 130 may come into contact with the drive rollers 6. Because the extending flanges 120 and 130 are made of wear-resistant material, the flanges 120 and 130 will not wear away or erode from contact with the drive rollers 6. Even if the drive faces 10b and 10d of the protected drive lug 10' do wear away or erode due to contact with the drive rollers 6, the drive rollers 6 of the planetary drive system 4 will drive the drive lugs 10' of the endless track 3A by engaging the edges 123 and 133 of the extending flanges 120 and 130, thereby preventing the planetary drive system 4 from "slipping" while attempting to drive the endless track 3A.

Figure 12:
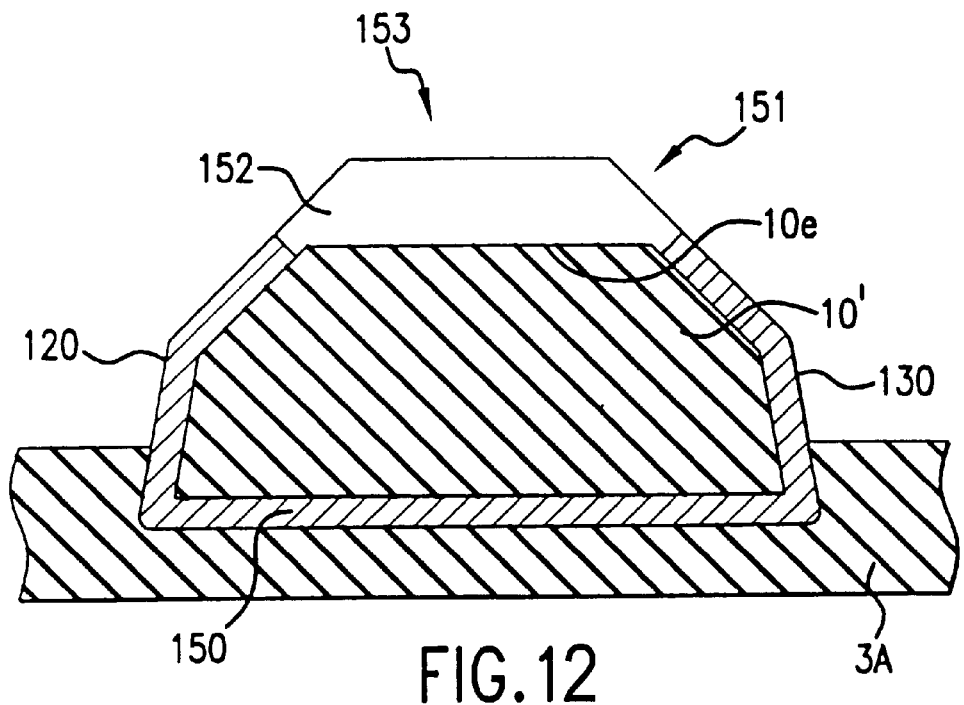
FIG. 12 is a cross-sectional view of a reinforcing brace embedded in an endless track to protect a drive lug, according to another embodiment of the invention.

Also, assuming the drive faces 10b or 10d do wear away, the top portion 10e of the protected drive lug 10' may wear away from the frictional engagement with the drive rollers 6. FIG. 12 is a cross-sectional view of another embodiment of a reinforcing brace 150 for protecting a drive lug 10' of the endless track 3 from such arm occurrence. The reinforcing brace 150 is substantially similar to the reinforcing brace1 100 depicted in FIGS. 9–11, but includes a cap 151.

Alternatively, the reinforcing brace 100' in FIG. 11A can be used to avoid abrasion damage to the top portion of the drive lug 10'.

The cap 151 is made of a wear-resistant material, such as metal and/or plastic materials. However, any material that can resist degradation or erosion due to the engagement of the drive rollers 6 and/or the frictional contact from the rollers 5 would be suitable. The cap 151 is attached, for example, by welding to the top portion of each flange 120 and 130. The cap 151 extends from the flange 120 to the other flange 130 to prevent the drive rollers 6 from wearing away the top portion 10e of the drive lug 10'. Thus, even if the drive faces 10b and 10d of the protected drive lug 10' do wear away or erode with contact of the drive rollers 6, the drive rollers 6 of the planetary drive system 4 will drive the drive lugs 10' of the endless track 3A by engaging the edges 123 and 133 of the extending flanges 120 and 130 as well as the drive surfaces 152 or 153 of the cap 151, depending on the rotation direction of the drive rollers, thereby preventing the planetary drive system 4 from "slipping" while attempting to drive the endless track 3A, as well as to prevent erosion of the top portion 10e of the drive lug 10', thereby extending the useful life of the lug 10'.

Figure 13:
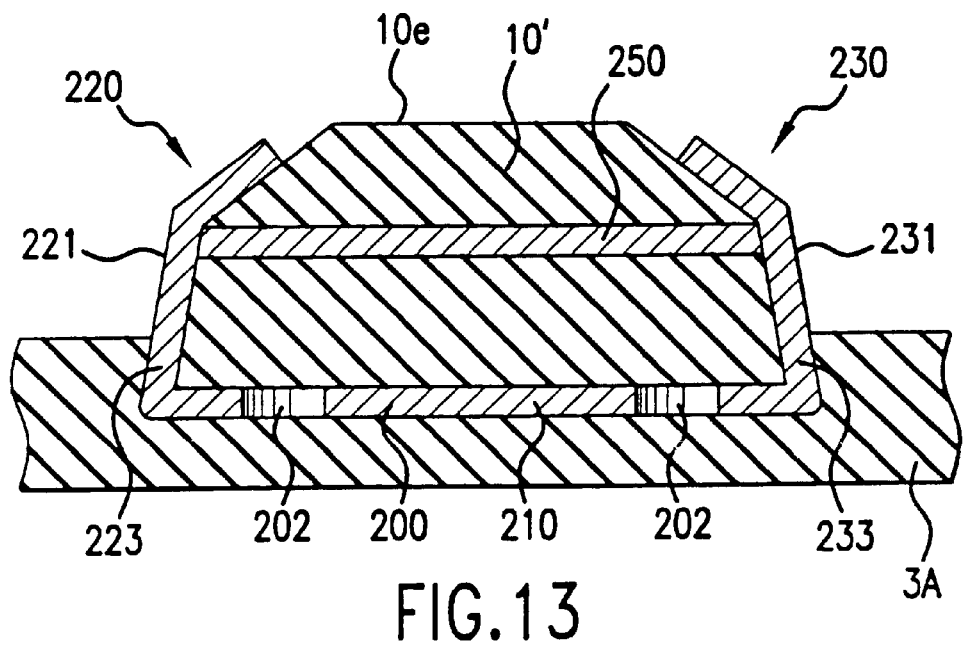
FIG. 13 is a cross-sectional view of another alternative embodiment of a reinforcing brace 12 embedded in an endless track to protect a drive lug.

FIG. 13 is a cross-sectional view of another reinforcing brace 200 embedded in an endless track 3 to protect a drive lug 10'. The exterior faces 221 and 231 of the extending flanges 220 and 230 serve to protect the upper and lower portions 10U, 10L of the longitudinal faces of the drive lug 10' from the roller wheels 5 when the endless track 3 moves in a direction parallel to the axes of the roller wheels 5. A support rod 250 maintains a distance between the flanges 220, 230.

Furthermore, the drive rollers 6 frictionally engage the drive faces 10b or 10d of each drive lug 10', depending on the rotation direction of the drive rollers 6. However, assuming wearing away of one of the drive faces 10b and 10d, edges 223 and 233 of the extending flanges 220 and 230 may come into contact with the drive rollers 6 in a manner substantially similar to the reinforcing brace 100 of FIGS. 9–11 discussed above. Also, if the top portion 10e of the protected drive lug 10' does wear away, the drive rollers 6 of the planetary drive system 4 will still be able to drive the drive lugs 10' of the endless track 3 by engaging the support rod 250, in addition to the edges 223 and 233 of the extending flanges 220 and 230, thereby preventing the planetary drive system 4 from "slipping" while attempting to drive the endless track 3A.

FIG. 13 also shows that a connecting section 210 of the reinforcing base 200 may connect the first and second flanges 220 and 230. The connecting section 210 may include one or more apertures 202 that are configured to interact with a portion of the endless track 3A to improve structural integrity and rigidity.

Figure 14:
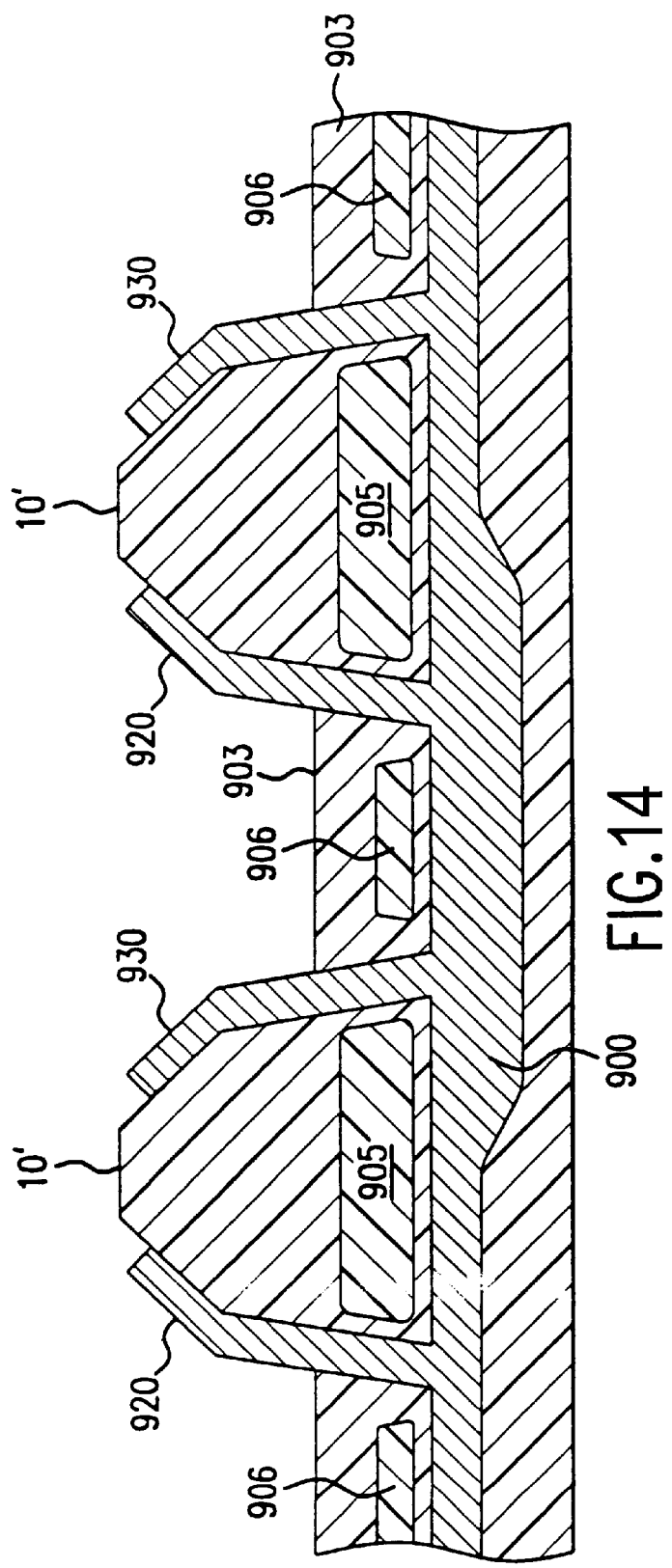
FIG. 14 is a cross-sectional view of a unitary reinforcing brace embedded in an endless track with reinforcing belts, according to another embodiment of the invention.

FIG. 14 shows a cross-sectional view of a unitary reinforcing brace 900 embedded in a reinforced endless track 903 according to another preferred embodiment of the invention. The reinforcing brace 900 includes two sets of flanges 920, 930 mounted on a common element embedded within the endless track 903. The endless track 903 is reinforced with belts 905, 906 extending within the track 903 in the longitudinal direction of the track 903. The belts can be made from a polymeric material, e.g., kevlar, that is different than the polymeric material from which the track body 904 is made. Moreover, the belts can also be cables and/or the track 903 can be made of a strength enhanced material. Furthermore, the belts 905 positioned within the drive lugs 10' can be larger than the belts 906 between and outside the drive lugs 10' in the longitudinal direction of the endless track 3A.

Additionally, although preferred embodiments of the invention as set forth herein describe an endless track as a closed-loop integral assembly, the endless track 3, 3A, 3B can be one or more sections interconnected by one or more master link joint assemblies, such as disclosed in U.S. Pat. No. 4,844,560 entitled "Endless Drive Track Joint Assembly"; U.S. Pat. No. 5,020,865 also entitled "Endless Drive Track Joint Assembly"; and U.S. Pat. No. 5,040,282 entitled "Method of Making A Modular Endless Track Drive System", all issued to Edwards et al. and all incorporated herein by reference in their entireties. For example, the reinforcing cables or belts 905 and 906 of FIG. 14 can be arranged for this purpose around a grooved rod sandwiched between connected portions of a master link joint assembly as shown in FIG. 12 of U.S. Pat. No. 4,844,560.

Furthermore, while positively driven endless tracks have been described, at least the reinforcing braces described herein can be used in friction driven tracks as well to protect each of a series of guide lugs, such as those used in Caterpillar's Challenger 85E and 95E tracks. Depending on the shape of the guide lugs, the flange of the reinforcing brace (such as shown in FIGS. 11A or 11B) need not have an angled-shape.

While the invention has been described in conjunction with the specific embodiments thereof, it is evident that many alternatives, modifications and variations will be apparent to those skilled in the art. For example, other arrangements and features are shown and described in co-pending U.S. patent application Ser. No. 09/271,150 to Edwards, incorporated herein by reference it its entirety. Accordingly, preferred embodiments of the invention as set forth herein are intended to be illustrative, not limiting. Various changes may be made without departing from the spirit and scope of the invention.

What is claimed is:

1. An endless drive track system for use with a tracked vehicle, comprising:
   a positively driven endless track having an interior surface and a plurality of drive lugs attached to the interior surface, each of the drive lugs including at least one drive face and first and second longitudinal faces, each of the first and second longitudinal faces having a first portion adjacent the interior surface and a second portion remote from the interior surface, said first and second portions defining an inside angle of less than 180° with respect to one another; and
   a drive system cooperateable with each said at least one drive face of the drive lug.

2. The endless drive track system according to claim 1, further comprising a plurality of roller wheels that guide and support the endless track, the plurality of roller wheels being positionable adjacent to the first and second longitudinal faces of the drive lugs.

3. The endless drive track system according to claim 2, wherein in the event that the roller wheels contact the first and second longitudinal faces, the roller wheels primarily contact the first portion of each of the first and second longitudinal faces.

4. The endless drive track system according to claim 2, wherein a distance between longitudinal faces of adjacent drive lugs is no more than about 3/16"–1/4" greater than a thickness of one of the roller wheels.

5. The endless drive track system according to claim 1, wherein the first portion of each of the first and second longitudinal faces is substantially perpendicular to the interior surface, and an exterior angle between each first portion and each corresponding second portion is about 30–45° as measured from the second portion to a line extending from the first portion.

6. The endless drive track system according to claim 5, wherein the first portion of the first longitudinal face is larger than the first portion of the second longitudinal face.

7. The endless drive track system according to claim 5, wherein the exterior angle between the first and second portions of the first longitudinal face is different than the exterior angle between the first and second portions of the second longitudinal face.

8. The endless drive track system according to claim 1, wherein the drive system includes a rotatable drum including a plurality of drive rollers circumferentially spaced around the drum, the drum including a central flange positioned to separate the drum into first and second drive sections, the first drive section of the drum having a first drive lug insertion depth larger than a second drive lug insertion depth of the second drive section of the drum, wherein a first one of the drive lugs accommodated in the first drive section of the drum has a height that is greater than a height of a second one of the drive lugs, adjacent the first one of the drive lugs, accommodated in the second drive section of the drum.

9. The endless drive track system according to claim 8, wherein the second portion of the first longitudinal face of the first one of the drive lugs that faces the central flange has different dimensions than the second portion of the second longitudinal face of the first one of the drive lugs.

10. The endless drive track system according to claim 1, further comprising a reinforcing brace including a first flange adjacent the first longitudinal face and a second flange adjacent the second longitudinal face.

11. The endless drive track system according to claim 10, wherein the reinforcing brace further comprises a support rod attached to an interior face of the first flange and an interior face of the second flange.

12. The endless drive track system according to claim 10, wherein the reinforcing brace includes a connecting section embedded within the interior surface and connecting the first and second flanges.

13. The endless drive track system according to claim 12, wherein the reinforcing brace further comprises:
    a support rod attached to an interior face of the first flange and an interior face of the second flange and extending substantially parallel to the connecting section.

14. The endless drive track system according to claim 13, wherein the horizontal section spans across at least two drive lugs and includes first and second sets of the first and second flanges.

15. The endless drive track system according to claim 10, wherein each of the first and second flanges includes a first flange portion and a second flange portion corresponding to said first and second portions of each of said first and second longitudinal faces.

16. The endless drive track system according to claim 10, further comprising a connecting section spanning across at least two drive lugs and including first and second sets of the first and second flanges.

17. The endless drive track system according to claim 1, wherein the endless track is reinforced with a plurality of belts extending within the endless track in a longitudinal direction of the endless track.

18. A positively driven endless track comprising:
    an interior surface; and a plurality of drive lugs attached to the interior surface, each of the drive lugs including at least one drive face and first and second longitudinal faces, each of the first and second longitudinal faces having a first portion adjacent the interior surface and a second portion remote from the interior surface, said first and second portions defining an inside angle of less than 180° with respect to one another.

19. The positively driven endless track according to claim 18, wherein the first portion of each of the first and second longitudinal faces is substantially perpendicular to the interior surface, and an exterior angle between each first portion and each corresponding second portion is about 30–45° as measured from the second portion to a line extending from the first portion.

20. The positively driven endless drive track according to claim 19, wherein the first portion of the first longitudinal face is larger than the first portion of the second longitudinal face.

21. The positively driven endless drive track according to claim 19, wherein the exterior angle between the first and second portions of the first longitudinal face is different than the exterior angle between the first and second portions of the second longitudinal face.

22. The positively driven endless drive track according to claim 18, wherein a first one of the drive lugs has a height that is greater than a height of a second one of the drive lugs adjacent the first one of the drive lugs.

23. The positively driven endless drive track according to claim 22, wherein the second portion of the first longitudinal face of the first one of the drive lugs has different dimensions than the second portion of the second longitudinal face of the first one of the drive lugs.

24. The positively driven endless track according to claim 18, further comprising a reinforcing brace having a first flange and a second flange, the first flange being adjacent the first longitudinal face and the second flange being adjacent the second longitudinal face.

25. The positively driven endless track according to claim 24, wherein the reinforcing brace further comprises a support rod attached to an interior face of the first flange and an interior face of the second flange.

26. The positively driven endless drive track according to claim 24, further comprising a connecting section connecting the first and second flanges.

27. The positively driven endless drive track according to claim 24, wherein the reinforcing brace further comprises:
a support rod attached to an interior face of the first flange and an interior face of the second flange; and
a connecting section connecting the first and second flanges.

28. The positively driven endless drive track according to claim 27, wherein the connecting section spans across at least two drive lugs and includes first and second sets of the first and second flanges.

29. The positively driven endless track according to claim 24, further comprising a cap attached to a top portion of the first and second flanges, the cap being positioned adjacent a top portion of each of the drive lugs.

30. The positively driven endless track according to claim 24, wherein each of the first and second flanges includes a first flange portion and a second flange portion corresponding to said first and second portions of said first and second longitudinal faces.

31. The positively driven endless track according to claim 18, wherein the endless track is reinforced with a plurality of belts extending within the endless track in a longitudinal direction of the endless track.

32. A reinforcing brace for protecting a longitudinal face of a lug of an endless track and comprising at least one flange positioned adjacent the longitudinal face, wherein the longitudinal face is an angled longitudinal face and the at least one flange includes a first flange portion and a second flange portion angled with respect to the first portion to protect the angled longitudinal face.

33. The reinforcing brace according to claim 32, wherein the lug is a drive lug of a positively driven endless track.

34. The reinforcing brace according to claim 32, wherein the at least one flange is attached to the longitudinal face with at least one of a fastener and an adhesive.

35. The reinforcing brace according to claim 32, wherein the at least one flange is embedded within the endless track adjacent the longitudinal face.

36. The endless drive track system according to claim 12, wherein the reinforcing brace further comprises at least one aperture in the connecting section, the at least one aperture being configured to interact with a portion of the endless track.

37. The positively driven endless drive track according to claim 26, wherein the connecting section includes at least one aperture.

38. The endless drive track system according to claim 1, wherein the endless track is reinforced with a plurality of cables extending within the endless track in a longitudinal direction of the endless track.

39. The positively driven endless drive track according to claim 18, wherein the endless track is reinforced with a plurality of cables extending within the endless track in a longitudinal direction of the endless track.

* * * * *